US006920578B1

United States Patent
Thompson et al.

(12)

(10) Patent No.: US 6,920,578 B1
(45) Date of Patent: Jul. 19, 2005

(54) METHOD AND APPARATUS FOR TRANSFERRING DATA BETWEEN A SLOWER CLOCK DOMAIN AND A FASTER CLOCK DOMAIN IN WHICH ONE OF THE CLOCK DOMAINS IS BANDWIDTH LIMITED

(75) Inventors: Timothy D. Thompson, Windsor, CO (US); Christopher D. Paulson, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 624 days.

(21) Appl. No.: 10/026,305

(22) Filed: Dec. 18, 2001

(51) Int. Cl.[7] ............................. G06F 5/06; G06F 7/00
(52) U.S. Cl. .............................. 713/600; 713/400
(58) Field of Search ........................................ 713/600

(56) References Cited

U.S. PATENT DOCUMENTS 5,163,132 A * 11/1992 DuLac et al. ................ 710/53
5,905,766 A * 5/1999 Nguyen ...................... 375/354
6,640,275 B1 * 10/2003 Kincaid ...................... 710/305

* cited by examiner

Primary Examiner—Lynne H. Browne
Assistant Examiner—Stefan Stoynov
(74) Attorney, Agent, or Firm—Yee & Associates

(57) ABSTRACT

A method and apparatus is provided for ensuring the integrity of data being transferred between two clock domains. Data is transferred on every clock signal from a faster clock domain to a slower clock domain. Data is collected by the data capture unit in two or more banks of registers for transfer to the second clock domain. The data collected has a first data size and is stacked with additional data of the first data size to generate data having a second data size. When two banks of registers are used, one bank of registers is being filled while the other bank of registers is passing data to the second clock domain. These two banks of registers provide two data paths to the synchronization logic for the second clock domain. This is especially advantageous when the limit of available bandwidth has been reached by one of the clock domains.

8 Claims, 3 Drawing Sheets

METHOD AND APPARATUS FOR TRANSFERRING DATA BETWEEN A SLOWER CLOCK DOMAIN AND A FASTER CLOCK DOMAIN IN WHICH ONE OF THE CLOCK DOMAINS IS BANDWIDTH LIMITED

BACKGROUND OF THE INVENTION

1. Technical Field

The present invention is directed generally toward a method and apparatus for processing data, and in particular, the present invention provides a method and apparatus for transferring data between two clock domains. Still more particularly, the present invention provides a method and apparatus for ensuring data integrity when synchronizing a transfer of data between a slower clock domain and a faster clock domain.

2. Description of the Related Art

Designs of computer systems and computer system architectures today can include the combination of one or more different subsystems with each subsystem having a different bus architecture. Subsystems are combined to facilitate the implementation of larger systems and typically known and standard subsystems are the ones selected for combining. By using known and standard subsystems, design time, manufacturing costs, design complexity, system maintenance and trouble shooting can all be reduced advantageously.

One standard bus architecture is the Peripheral Component Interconnect (PCI) bus standard. Computer systems can communicate with coupled peripherals using different bus standards including the PCI bus standard, or alternatively, using the Industry Standard Architecture (ISA) and Extended Industry Standard Architecture (EISA) bus standards. Recently, the IEEE 1394 serial communication standard has become a popular bus standard adopted by manufacturers of computer systems and peripheral components for its high speed and interconnection flexibilities. Each of the above communication standards communicates information (e.g., in data packets) at particular clock rates depending on the clock speed selected for the bus architecture.

In transferring or sharing data between different subsystems, data may be required to be synchronized because interconnected subsystems may not necessarily communicate or operate at the same clock frequency. With different bus architecture standards available within computer systems and communications systems, a computer device using one bus standard or "clock domain" may be coupled to and communicate with another computer or device using a different bus standard having a different clock domain. Interface circuits are employed to synchronize data transfers between different clock domains.

One issue that must be addressed by these interface circuits is to ensure data integrity in the transfer of data from one clock domain to another clock domain. This problem is present in transferring data across an asynchronous interface in which one side of the interface has reached the limit of available bandwidth. Write and data valid signals generated by traditional synchronization techniques may not be able to guarantee valid data when one of the clock domains serviced by the interface is bandwidth limited. When a transfer occurs on every clock cycle, the bandwidth is limited on one side of the clock domain. The problem that arises is that this amount of time may be insufficient for holding the data in the registers and synchronizing the new data to the other clock domain. As a result, a portion of the data within the registers may not be valid while other portions of the data within the register are valid when the data is synchronized across the clock domains.

Thus, it would be advantageous to have an improved method and apparatus for ensuring data integrity in synchronizing between a slower clock domain and a faster clock domain when data is transferred between the clock domains on every clock cycle in the slower clock domain.

SUMMARY OF THE INVENTION

The present invention provides a method and apparatus for ensuring the integrity of data being transferred between two clock domains in which one clock domain is a faster clock domain than the other clock domain in which data is transferred on every clock signal from the slower clock domain. Data is received at a data collection or data capture unit for transfer to the second clock domain. The data received has a first data size and is stacked with additional data of the first data size to generate data having a second data size. For example, the first data size may be 16 bits while the second data size is 32 bits. Data is collected by the data capture unit in two or more banks of registers for transfer to the second clock domain. When two banks of registers are used, one bank of registers is being filled while the other bank of registers is passing data to the second clock domain. These two banks of registers provide two data paths to the synchronization logic for the second clock domain. This method and apparatus is especially advantageous when the limit of available bandwidth has been reached by one of the clock domains.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
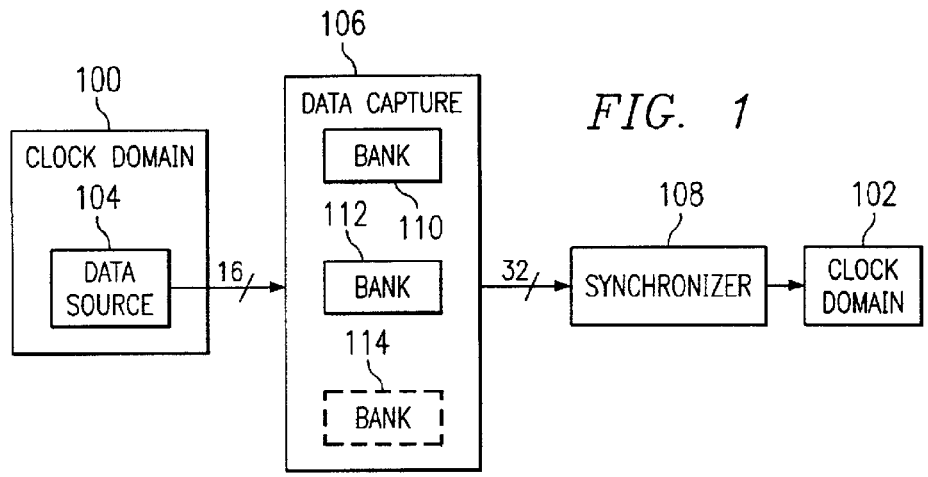
FIG. 1 is a diagram illustrating components used in transferring data from one clock domain to another clock domain in accordance with a preferred embodiment of the present invention.

With reference now to the figures and in particular with reference to FIG. 1, a diagram illustrating components used in transferring data from one clock domain to another clock domain is depicted in accordance with a preferred embodiment of the present invention. In this example, data is transferred from clock domain 100 to clock domain 102. In this example, data source 104 provides data using a bandwidth of 16 bits. Thus, the data size received by data capture unit 106 is 16 bits. Data capture unit 106 generates, in this example, data having a data size of 32 bits. This data is sent to synchronizer 108 for transfer to clock domain 102.

In a preferred embodiment of the present invention, data capture unit 106 includes two banks of registers, bank 110 and bank 112. Each of these banks of registers holds data having a data size of 32 bits in these examples. Data source 104 provides data having a data size of 16 bits. The data is stacked within the banks to form a 32 bit value. In actual operation, one bank of registers is being filled while data in the other bank of registers is being sent to synchronizer 108. For example, when data is first sent to data capture unit 106 for transfer to clock domain 102, data source 104 will provide data having a 16 bit data size to bank 110 to form a 32 bit block of data. When bank 110 is filled, data capture unit 106 will then fill bank 112 with data from data source 104 while the data stacked in 110 is passed to synchronizer 108. Thereafter, bank 112 becomes filled with data. Data capture unit 106 then fills bank 110 with data and transfers the data within bank 112 to clock domain 102 through synchronizer 108. As can be seen, the filling and transferring of data alternates between bank 110 and bank 112. This feature of the present invention ensures that data being passed to clock domain 102 is stable while being able to support a data transfer on the occurrence of every clock pulse in clock domain 100. The stacking of data within the banks also provides for taking into account the limit of bandwidth within clock domain 100.

Although the depicted examples illustrate the use of two banks of registers, additional banks of registers may be used. For example, bank 114 may be added to receive and transfer data The filling and transferring of data rotates between banks 110, 112, and 114, if three banks of registers are used. Additionally, the mechanism of the present invention may be applied to other data sizes other than 16 and 32 bit bus systems as illustrated in FIG. 1. For example, clock domain 100 may employ a 32 bit bus while clock domain 102 employs a 64 bit bus. Alternatively, clock domain 100 may employ a 16 bit bus while clock domain 102 uses a 64 bit bus. The examples illustrate stacking the data such that the data size in the banks matches that of clock domain 102. The size of the stacked data is not required to equal that of the target clock domain, clock domain 102. For example, with a 16 bit data size in clock domain 100 and a 64 bit data size in clock domain 102, data may be stacked to a size of 48 bits instead of 64 bits for transfer to clock domain 102.

Figure 2:
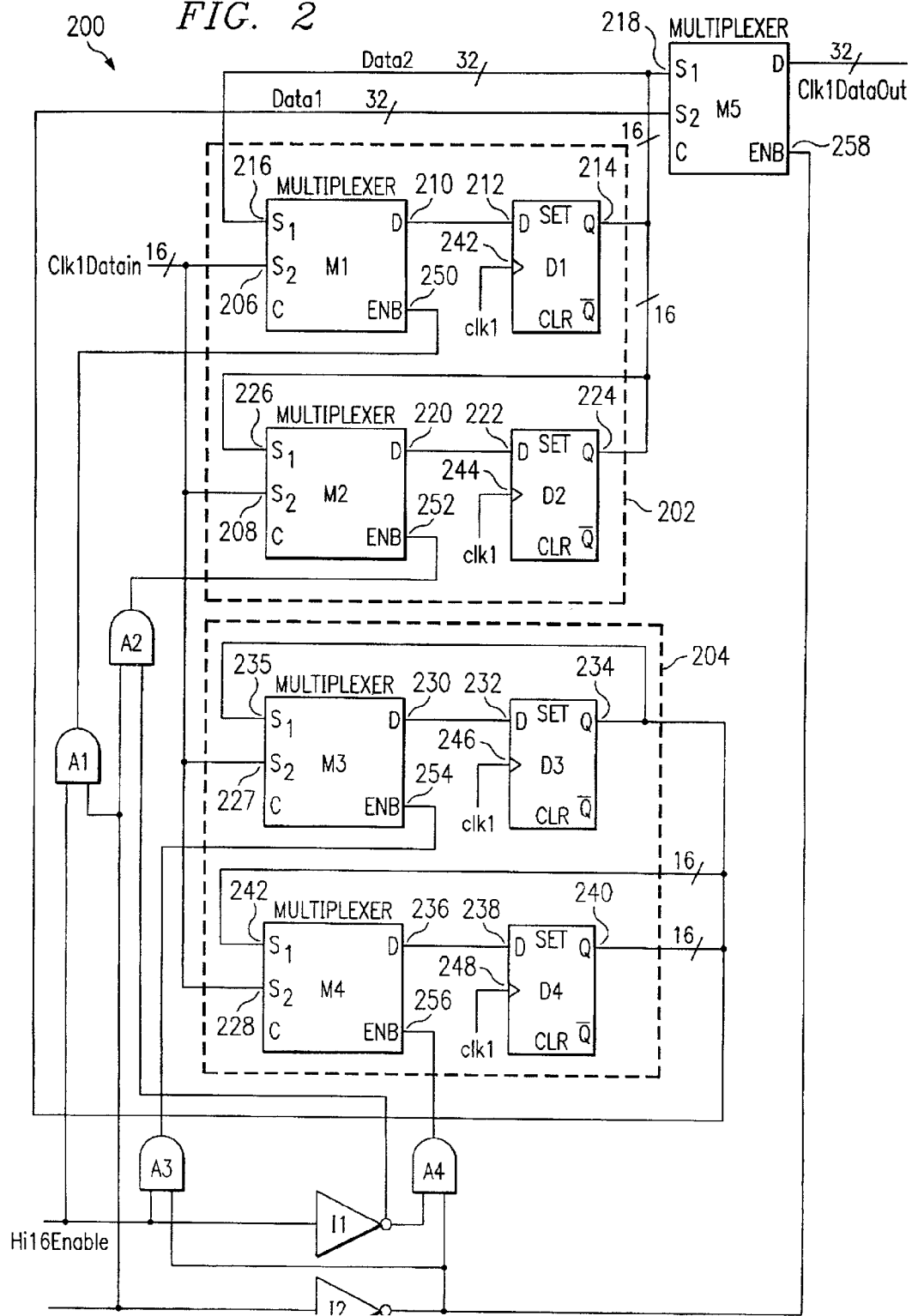
FIG. 2 is a logic diagram of a data capture unit in accordance with a preferred embodiment of the present invention.

Turning next to FIG. 2, a logic diagram of a data capture unit is depicted in accordance with a preferred embodiment of the present invention. Data capture unit 200 is an example of a data capture unit, which may be implemented as data capture unit 106 in FIG. 1.

In this example, data capture unit 200 includes two banks of registers, bank 202 and bank 204. Each of these banks of registers is designed to receive 16 bit values of data as the data size and stack these values to form a 32 bit value as the data size for the target clock domain. Bank 202 includes multiplexer M1, multiplexer M2, D flip-flop D1, and D flip-flop D2. Bank 204 includes multiplexer M3, multiplexer M4, D flip-flop D3, and D flip-flop D4. A switch implemented using multiplexer M5 is used to select between bank 202 and bank 204 to transfer data to a synchronizer, such as synchronizer 108, in FIG. 1.

Data is received at input 206 in multiplexer M2 and input 208 in multiplexer M2 from a data source, such as data source 104, in FIG. 1. The data is received in a data size of 16 bits. Output 210 of multiplexer M1 is connected to input 212 of D flip-flop D1. Output 214 in D flip-flop D1 is connected to input 216 in multiplexer M1 to form a feedback loop as well as to input 218 in Multiplexer M5. Output 220 in multiplexer M2 is connected to input 222 of D flip-flop D2. Output 224 of D4 is connected to input 226 of multiplexer M2. Additionally, output 224 is connected to input 218 of Multiplexer M5. Output 214 and output 224 are each 16 bits and are combined to form a data size of 32 bits into input 218 in Multiplexer M5.

In bank 204, data having a data size of 16 bits may be received at input 227 and input 228 in multiplexer M3 and multiplexer M4, respectively. Output 230 of multiplexer M3 is connected to input 232 of D flip-flop D3. Output 234 in D flip-flop D3 is connected to input 235 in multiplexer M3 to form a feedback loop. Additionally, output 234 also is connected to input 218 in Multiplexer M5. Next, output 236 in multiplexer M4 is connected to input 238 of D flip-flop D4. Output 240 of D4 is connected to input 242 of multiplexer M4 and to input 218 of Multiplexer M5. Output 234 and output 240 are each 16 bits and are combined to form a data size of 32 bits into input 218 in Multiplexer M5.

The transfer of data is driven by a clock signal clk1, which is applied to clock inputs 242, 244, 246, and 248 in D flip-flops D1, D2, D3, and D4, respectively. Multiplexers M1, M2, M3, and M4 may be enabled to pass data by the application of enable signals, BankEnable and Hi16Enable, which are applied to enable inputs 250, 252, 254, and 256 through AND gates A1, A2, A3, A4, and inverters I1 and I2. Multiplexer M5 is enabled by the application of the enable signal BankEnable to enable input 258. These gates and inverters are used to stack data within each bank as well as enable or select a bank to transfer data When the signal BankEnable is high or a logic 1, bank 202 fills with data while bank 204 passes data to Multiplexer M5. When the signal BankEnable transitions to a low or a logic 0, bank 204 fills with data while bank 202 passes data to multiplexer M5. The enable signal Hi16Enable is used to stack data in the bank that is being filled with data. For example, if bank 202 is being filled with data, a high signal or a logic 1 causes the top 16 bits of the data value being stacked to be received by multiplexer M1. A low signal or a logic 0 causes the lower 16 bits to be received by multiplexer M2. Thus, in addition to stacking data to form a desired data size, data capture unit 200 provides two paths for transferring data to a target clock domain through bank 202 and bank 204.

Multiplexer M5 selects data received from D flip-flop D1, D flip-flop D2, or from D flip-flop D3 or D flip-flop D4 to generate a signal Clk1DataOut, which has a 32 bit data size in this example for transfer to a synchronizer. A timing diagram is provided in FIG. 4 and described below to illustrate the operation of data capture unit 200.

Figure 3:
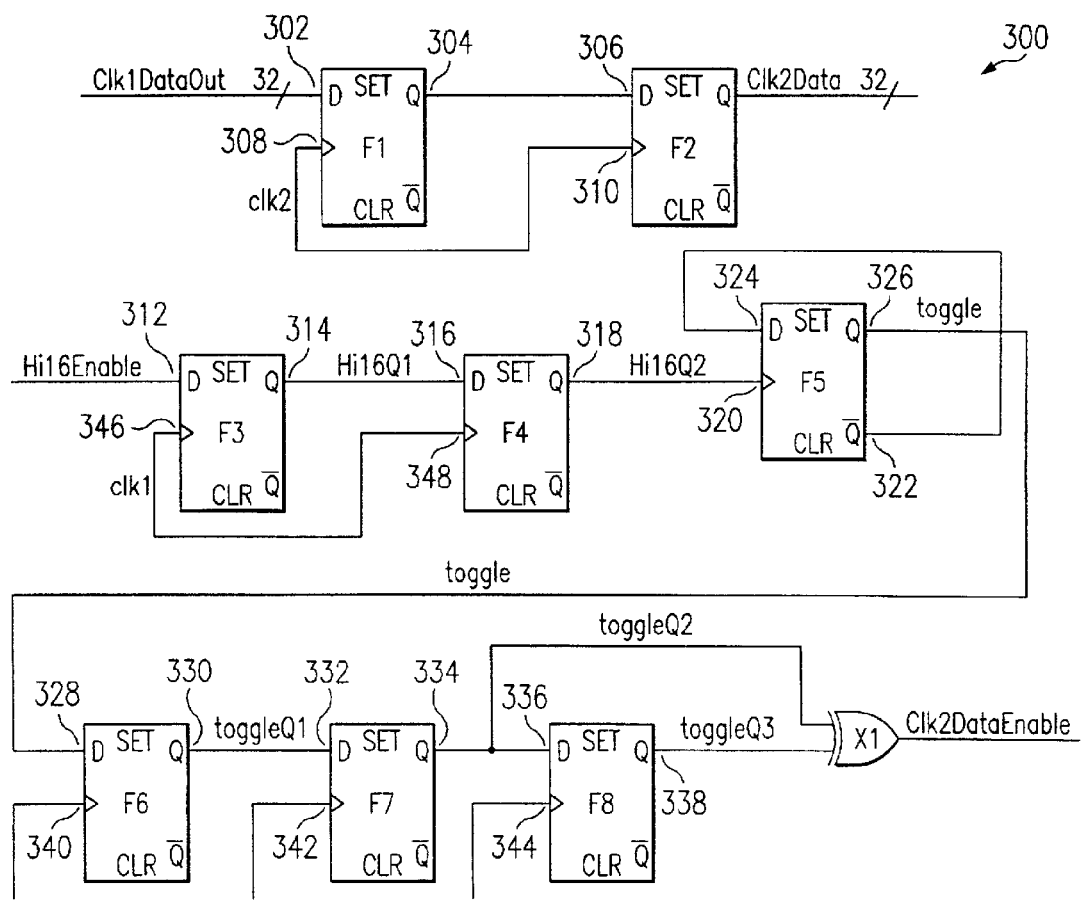
FIG. 3 is a logic diagram of a synchronizer circuit in accordance with a preferred embodiment of the present invention.

Depending on the particular implementation, additional banks may be employed within data capture unit 200. Further, the particular data sizes and components used are not meant as limitations to the implementation of the present invention. For example, the stacking of data may be implemented using three or more sets of multiplexers and flip-flops instead of the two depicted in banks 202 and 204. In addition, the number of registers in the bank is a function of how many bits are being stacked. For example, in FIG. 2, banks 202 and 204 each contain two multiplexers and two flip-flops to stack 16 bit portions of data into 32 bit portions. If the data is being received in 32 bit portions and is being sent out as 32 bit portions, then a bank would only require a single multiplexer and a single flip-flop. As a further example, if 16 bit portions of data are being stacked into 48 bit portions of data, each of these banks would contain three multiplexers and three flip-flops. Of course, other types of logic components may be used to achieve the same results as banks 202 and 204. Turning next to FIG. 3, a logic diagram of a synchronizer circuit is depicted in accordance with a preferred embodiment of the present invention. Synchronizer circuit 300 may be implemented in synchronizer 108 in FIG. 1 to synchronize the transfer of data from one clock domain to another clock domain.

Synchronizer circuit 300 includes D flip-flop F1, D flip-flop F2, D flip-flop F3, D flip-flop F4, D flip-flop F5, D flip-flop F6, D flip-flop F7, and D flip-flop FS and exclusive OR (XOR) gate X1. D flip-flops F1 and Y2 are used to send data to the target clock domain, such as clock domain 102 in FIG. 1. D flip-flops F1–F8 and XOR gate X1 are used to generate a valid pulse, CLk2DataEnable to indicate that the data, CLk2Data is valid. D flip-flop F1 receives Clk1DataOut from multiplexer M5 in FIG. 2 at input 302. The output 304 of D flip-flop F1 is connected to input 306 of D flip-flop F2. Clock input 308 and 310 receive clock signal clk2, which is the clock signal from the target domain to drive passing of the data Clk2Data, which has a data size of 32 bits in this example. D flip-flop F3 receives a signal Hi16Enable signal at input 312. Output 314 in D flip-flop F3 is connected to input 316 in D flip-flop F4. Output 314 generates a Hi16Q1 signal as an output. Signal Hi16Q2 is generated by output 318 in D flip-flop F4. This output is connected to clock input 320 in D flip-flop F5. The Hi16Q2 signal as an output is received at clock input 320 in D flip-flop F5 for use as a clock signal. Output 322 of D flip-flop F5 is connected to input 324 to form a feedback loop. Output 326 in D flip-flop F5 generates a toggle signal received by input 328 in D flip-flop F6. Toggle signal toggleQ1 is generated at output 330 in D flip-flop F6 with this output being connected to input 332 in D flip5 flop F7. Output 334 in D flip-flop F7 is connected to input 336 in D flip-flop F8. Output 338 is connected to XOR gate X1, which generates an enable signal Clk2DataEnable. An additional input into XOR gate X1 is the signal toggleQ2, which is generated at output 334 at D flip-flop F7. D flip-flops F6, F7, and F8 receive clock signal clk2 at clock inputs 340, 342, and 344, PI while D flip-flops F3 and F4 receive clock signal clk1 at clock inputs 346 and 348.

Synchronizer circuit 300 is only intended as an example of a synchronizer circuit that may be used to synchronize the transfer of data and is not intended as a limitation to the type of synchronizer circuit that may be employed. Any known synchronization circuit or technique may be used depending on the particular implementation. Operation of synchronization circuit 300 is provided in more detail in the timing diagram in FIG. 4 as described below.

Figure 4:
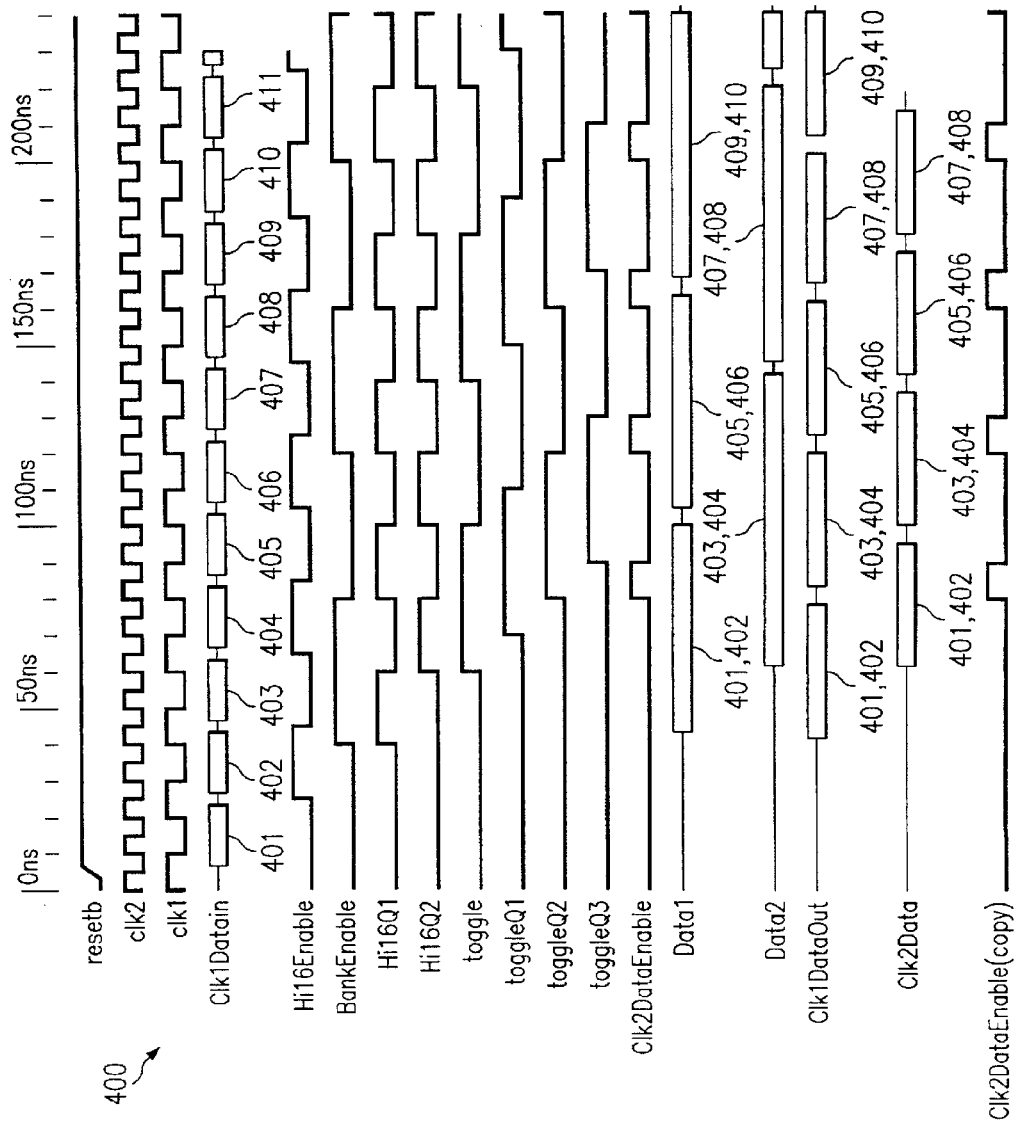
FIG. 4 is a timing diagram illustrating signals used in passing data from one clock domain to another clock domain in accordance with a preferred embodiment of the present invention.

Turning next to FIG. 4, a timing diagram illustrating signals used in passing data from one clock domain to another clock domain are depicted in accordance with a preferred embodiment of the present invention. In this example, the signals illustrated in timing diagram 400 illustrate input and output signals used to transfer data in data capture unit 200 in FIG. 200 and synchronizer circuit 300 in FIG. 3. First, signal resetb is used to clear all of the D flip-flops in data capture unit 200 and synchronizer circuit 300. Next, clock signal clk2 and clock signal clk1 represent the clock signals in the two different clock domains. As can be seen, clock signal clk2 is faster than clock signal clk1. Data signal ClkDataIn represents data from a data source, such as data source 104 in FIG. 1. In these examples, data signal ClkDataIn includes data having a 16 bit data size. Next, enable signal Hi16Enable is the enable signal used to fill the top or bottom 32 bits in a bank of registers, such as in multiplexers M1 and M2 in bank 202 in FIG. 2. Enable signal BankEnable is used to enable a bank, such as bank 202 or 204 to send data through multiplexer M5. Signals Hi16Q1 and Hi16Q2 are valid pulses generated by D flip-flop F3 and D flip-flop F4, respectively. Toggle signals toggle, toggleQ1, toggleQ2, and toggleQ3 are generated by D flip-flops F5, F6, F7, and F8, respectively, in the synchronization circuit depicted in FIG. 3.

Data signal Clk2Data is the data transferred to the target clock domain, and enable signal Clk2DataEnable is the signal used to indicate when the data is valid. The signal Clk1DataOut is generated by multiplexer M5 in data capture unit 200 and received by D flip-flop F1 in synchronization circuit 300. The data signals Data1 and Data2 represent the data output by bank 204 and bank 202, respectively in data capture unit 200 in FIG. 2.

These signals illustrate the stacking of data into the different banks in data capture unit 200. In this example, data signal Clk1DataIn includes data 401–411. Data 401 is stored in multiplexer M3 while data 402 is stored in multiplexer M4 As can be seen, the signal ft Hi16Enable allows for the enablement of one of these two multiplexers in bank 204. This signal performs a similar function with respect to multiplexer M1 and multiplexer M2 in bank 202 when data is being stacked in this bank. When the data is stacked, it is generated as data signal Data1 in a 32 bit data size by bank 204. A similar function occurs with the generation of data signal Data2 from bank 202. When enable signal BankEnable is high, data signal Clk1DataOut generates data from bank 204. When this enable signal goes low, data signal Clk1DataOut generates data from bank 202. As can be seen, data is clocked into the data capture unit on every clock signal clk1, which represents the slower clock domain in this example. The reuse of reference numbers 401–411 from Clk1DataIn in other data signals in FIG. 4 represents the same corresponding data in these other data signals. Thus, the present invention provides an improved method and apparatus for transferring data from one clock domain to another clock domain. The mechanism of the present invention provides two data paths, which feed the synchronization logic, such as synchronization circuit 300 in FIG. 3. While one bank of registers is being filled with data from the first clock domain, the other bank of registers passes data to the second clock domain. The mechanism of the present invention stacks the data into a data size for use in the second clock domain. Through this mechanism, data integrity is ensured when synchronizing the transfer of data between a slower clock domain and a faster clock domain when one of the interfaces is bandwidth limited.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data transfer apparatus for transferring data from a first clock domain to a second clock domain, the data transfer apparatus comprising:

a first bank of registers having an input and an output, wherein the input receives a first size of data and the output outputs a second size of data in which the second size of data is twice the first size of data;

a second bank of registers having an input and an output, wherein the input receives a first size of data and the output outputs a second size of data in which the second size is twice the first size; and a switch having a first input connected to the output of the first bank of registers, a second input connected to the output of the second bank of registers and an output, wherein the switch selects data from one of the first bank of registers and a second bank of registers for output at the output to the second clock domain;

wherein the switch is a multiplexer, wherein filling of data and transferring of data occurs in an alternating fashion between the first bank of registers and the second bank of registers such that one bank of registers is filled with data while another bank of registers transfers data to a synchronizer unit and wherein the first bank of registers comprises;

a first multiplexer having a first input input, a second input, and an output, wherein data of the first size is received at the second input from a data source;

a first latch having an input and an output, wherein the input is connected to the output of the first multiplexer and the output is connected to the first input of the first multiplexer;

a second multiplexer having a first input input, a second input, and an output, wherein data of the first size is received at the second input from the source; and a second latch having an input and an output, wherein the input is connected to the output of the second multiplexer and the output is connected to the first input of the second multiplexer, wherein the output of the first latch and the output of the second latch form the output of the second bank of registers and wherein the first multiplexer and the second multiplexer are alternately enabled to receive data from the source.

2. The data transfer apparatus of claim 1, wherein data is transferred from the output of the switch to the second clock domain through a synchronizer unit connected to the output of the switch, wherein the synchronizer unit synchronizes a transfer of data of the second size from one of the first bank of registers or the second bank of registers selected by the switch to the second clock domain.

3. The data transfer apparatus of claim 1, wherein the first bank of registers stack data of the first size to form data of the second size.

4. The data transfer apparatus of 1, wherein the second bank of registers comprises:

a third multiplexer having a first input, a second input, and an output, wherein data of the first size is received at the second input from a data source;

a third latch having an input and an output, wherein the input is connected to the output of the third multiplexer and the output is connected to the first input of the third multiplexer;

a fourth multiplexer having a first input, a second input, and an output, wherein data of the first size is received at the second input from the source; and a fourth latch having an input and an output, wherein the input is connected to the output of the fourth multiplexer and the output is connected to the first input of the fourth multiplexer, wherein the output of the first latch and the output of the fourth latch form the output of the second bank of registers and wherein the third multiplexer and the fourth multiplexer are alternately enabled to receive data from the source.

5. The data transfer apparatus of claim 1 further comprising:

at least one more bank of registers having an input and an output, wherein the input receives a first size of data and the output outputs a second size of data in which the second size is twice the first size, wherein the switch includes a third input connected to the output of the third bank of registers and wherein filling of data and transferring of data in the first bank of registers, the second bank of register, and the at least one more bank of registers rotates between the first bank of registers, the second bank of registers, and the at least one more bank of registers to avoid corruption of data transferred to the second clock domain.

6. The data transfer apparatus of claim 1, wherein the first size of data is 16 bits and the second size of data is 32 bits.

7. The data transfer apparatus of claim 1, wherein the first size of data is 32 bits and the second size of data is 64 bits.

8. The data transfer a of claim 1, wherein the first clock domain is slower than the second clock domain.

* * * * *